(12) United States Patent
Rodarte-Gonzalez

(10) Patent No.: US 11,266,133 B2
(45) Date of Patent: Mar. 8, 2022

(54) MOLLUSC FARMING MACHINE

(71) Applicant: Rodarte Enterprises, Bow, WA (US)

(72) Inventor: Gerardo Rodarte-Gonzalez, Bow, WA (US)

(73) Assignee: RODARTE ENTERPRISES, Bow, WA (US)

( * ) Notice: Subject to any disclaimer, the term of this patent is extended or adjusted under 35 U.S.C. 154(b) by 439 days.

(21) Appl. No.: 16/457,917

(22) Filed: Jun. 28, 2019

(65) Prior Publication Data

US 2020/0000071 A1    Jan. 2, 2020

Related U.S. Application Data

(60) Provisional application No. 62/691,168, filed on Jun. 28, 2018.

(51) Int. Cl.
| | |
|---|---|
| *A01K 80/00* | (2006.01) |
| *A01B 3/36* | (2006.01) |
| *A01B 63/10* | (2006.01) |
| *A01B 17/00* | (2006.01) |
| *A01B 49/02* | (2006.01) |
| *A01B 13/00* | (2006.01) |

(52) U.S. Cl.
CPC .............. *A01K 80/00* (2013.01); *A01B 3/36* (2013.01); *A01B 13/00* (2013.01); *A01B 17/00* (2013.01); *A01B 49/02* (2013.01); *A01B 63/10* (2013.01)

(58) Field of Classification Search
CPC ........... A01B 3/36; A01B 13/00; A01B 17/00; A01B 63/10; A01K 80/00; A22C 29/00

USPC .......................................................... 37/315
See application file for complete search history.

(56) References Cited

U.S. PATENT DOCUMENTS

| | | | | |
|---|---|---|---|---|
| 4,563,830 | A * | 1/1986 | Cain, Jr | A01K 80/00 |
| | | | | 43/17.1 |
| 4,798,020 | A * | 1/1989 | George | A01K 80/00 |
| | | | | 209/935 |
| 4,944,108 | A * | 7/1990 | George | A01K 61/59 |
| | | | | 43/6.5 |
| 9,968,104 | B2 * | 5/2018 | Merry | A22C 29/043 |

FOREIGN PATENT DOCUMENTS

| | | | |
|---|---|---|---|
| CN | 104847855 | * | 8/2015 |
| JP | 11-266743 | * | 10/1999 |
| KR | 2018096202 | * | 8/2018 |
| KR | 2019141416 | * | 12/2019 |

\* cited by examiner

*Primary Examiner* — Gary S Hartmann

(57) ABSTRACT

A mollusc farming machine deploys a tillage assembly connected by a support frame to a vehicle platform. The vehicle platform enables the user to mechanically traverse the tillage assembly across an aquaculture harvesting area, digging into the earth of the harvesting area in order to harvest clams and other molluscs. An agitating mechanism causes reciprocal motion of the tillage assembly in order to break up the aquaculture earth as a tilling section of the tillage assembly is displaced at an angle through the earth, forcing the earth and any buried molluscs onto the tillage section. The agitating motion further serves to sift the earth by causing dirt, plant matter and other debris to fall through spaces between a plurality of sifting rods of the tilling section, leaving behind any molluscs previously buried within the earth to be collected by workers.

16 Claims, 10 Drawing Sheets

MOLLUSC FARMING MACHINE

The current application claims a priority to the U.S. Provisional Patent application Ser. No. 62/691,168 filed on Jun. 28, 2018.

FIELD OF THE INVENTION

The present invention relates generally to agriculture. More particularly, the present invention relates to a mobile mollusc farming machines that can easily harvest and process clams buried within the ground.

BACKGROUND OF THE INVENTION

In present times, individuals are always looking for ways to efficiently harvest clams. In conventional systems, farmers would often employ workers that would manually dig out the buried clams in an aquaculture site. Manually harvesting and processing clams is not only a time consuming and laborious process but can also lead to incorrect harvesting of unsuitable clams, and/or debris, leading to a loss in profits.

The present invention aims to solve these problems. The present invention utilizes is a mobile clam harvester that eliminates the need for workers to dig up and process clams in aqua-culture sites manually. The present invention is adjustable such that the user can properly adjust and calibrate the optimal amount of ground to grade in the aquaculture site. The present invention processes and exposes harvestable clams to the workers, where said harvestable clams can be easily picked up by the workers. The present invention is integrated on to a vehicle, allowing for faster harvesting rates, as well as easy storage of the present invention when not in use.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

SUMMARY OF THE INVENTION

The present invention provides a quick and effective means of harvesting clams or other molluscs in aquaculture sites such that it does not damage the processed clams. Additionally, the present invention provides a precise and efficient means of digging up and processing the clams suitable for aquaculture sites. Furthermore, the present invention allows workers to produce better harvest yields compared to manual systems.

DETAIL DESCRIPTIONS OF THE INVENTION

Figure 1:
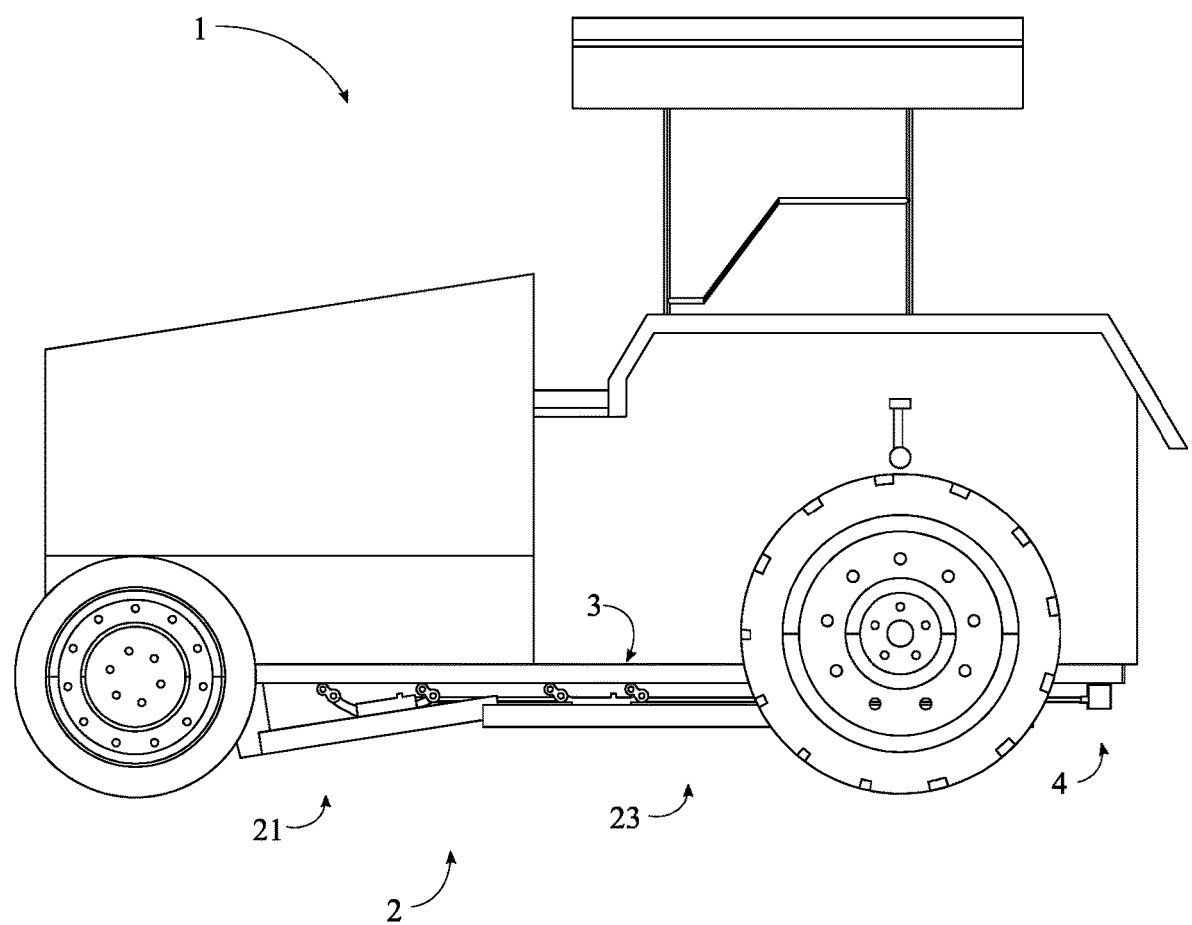
FIG. 1 is a side perspective view of the present invention.
Figure 2:
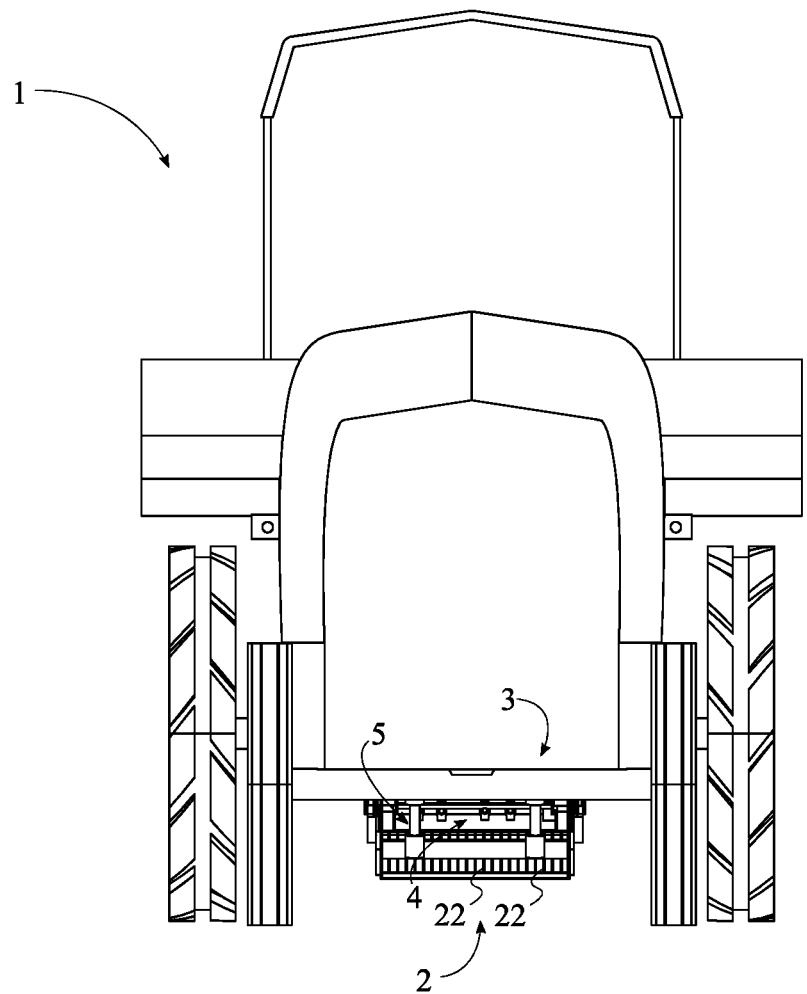
FIG. 2 is a front view of the present invention.
Figure 3:
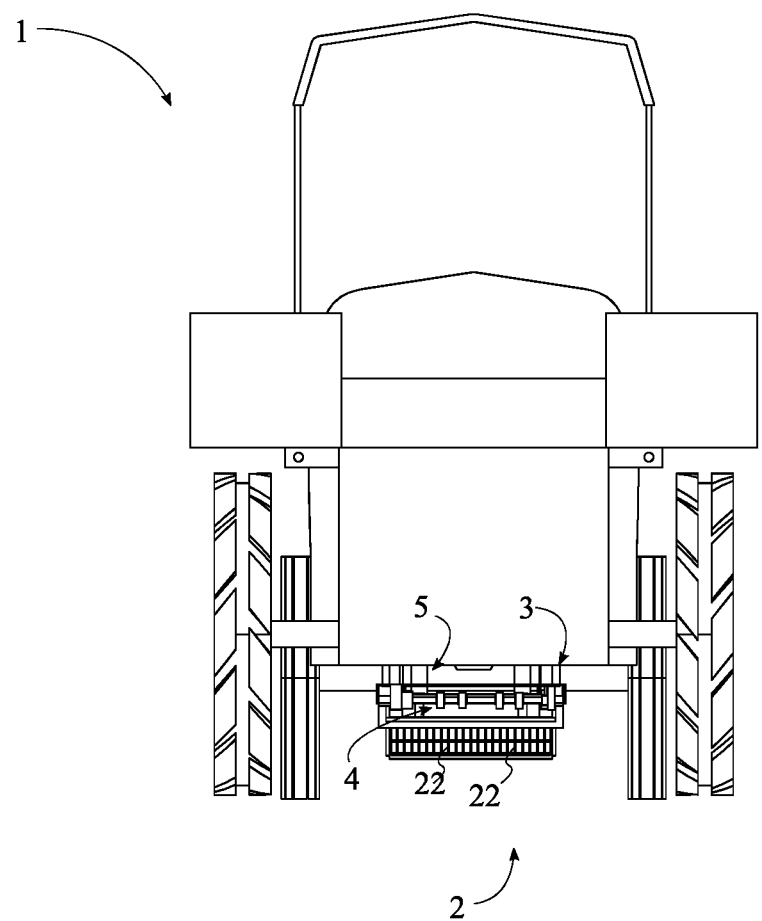
FIG. 3 is a rear view of the present invention.
Figure 4:
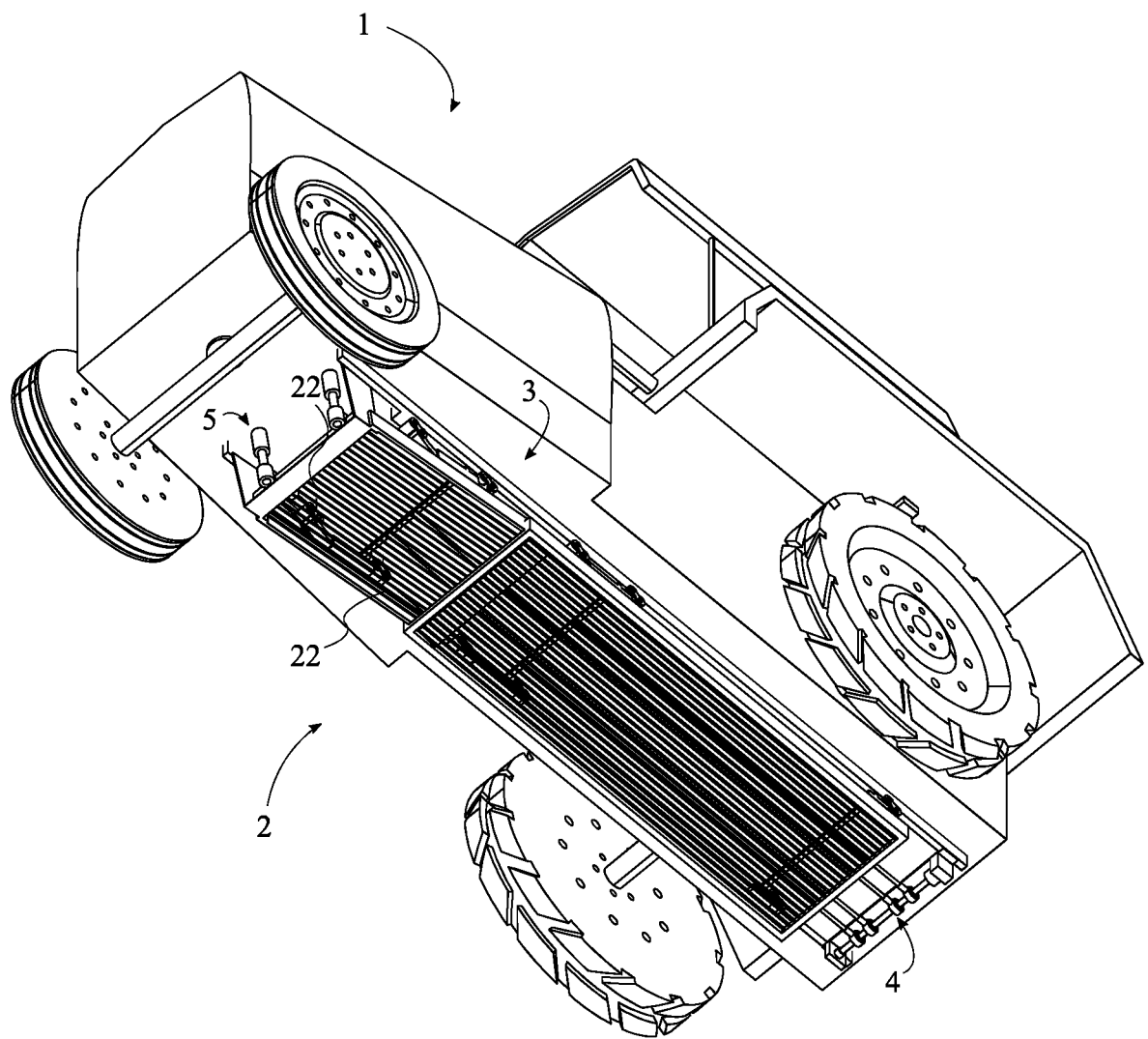
FIG. 4 is a lowered front perspective view of the present invention.
Figure 5:
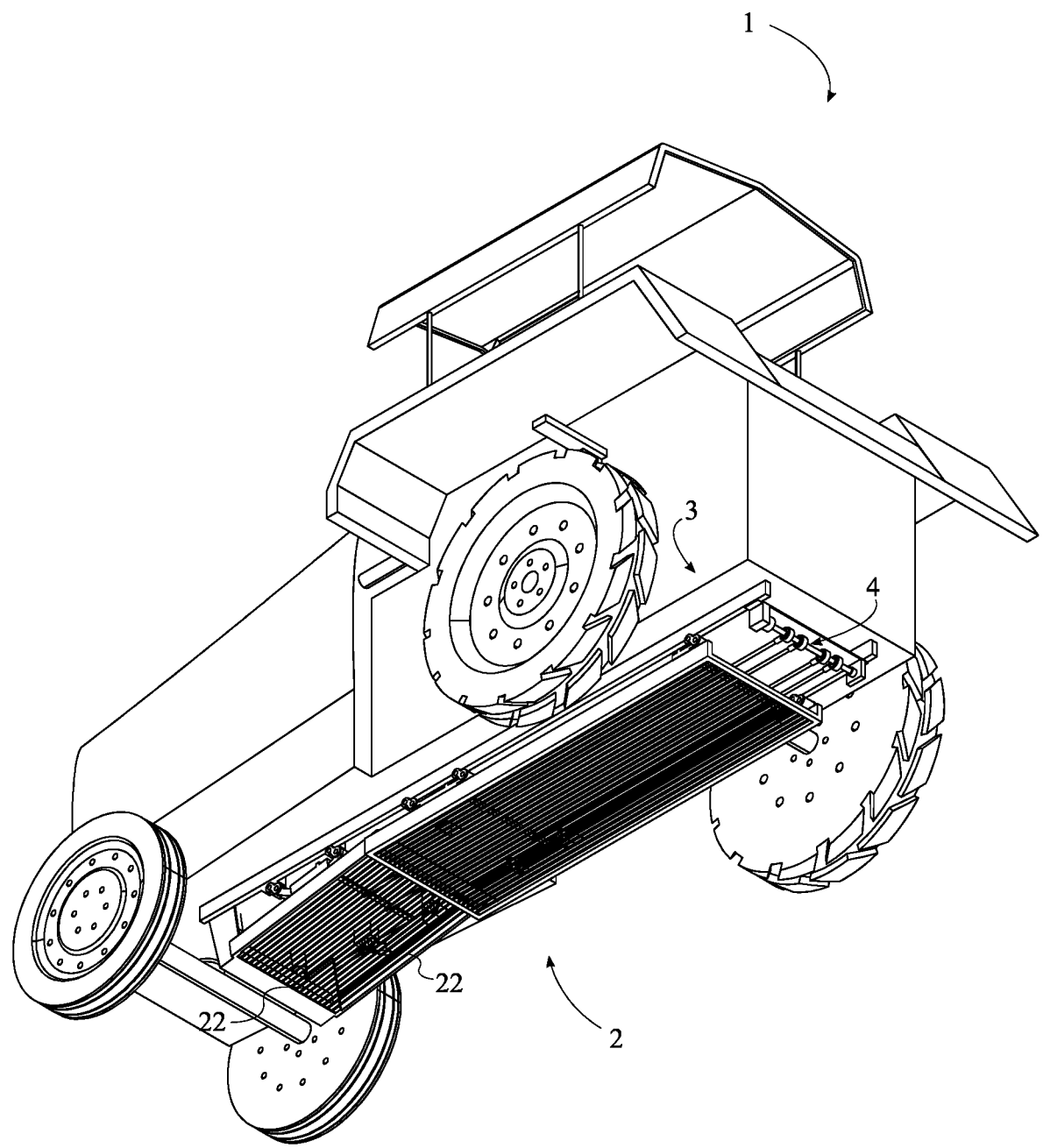
FIG. 5 is a lowered rear perspective view of the present invention.
Figure 6:
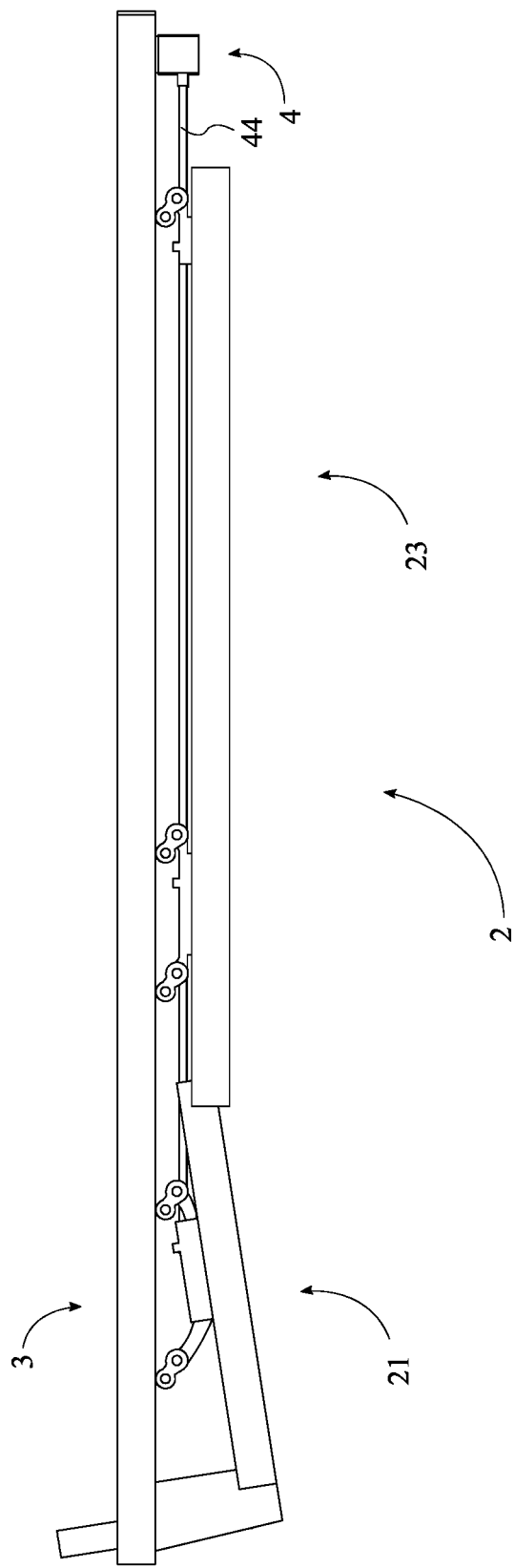
FIG. 6 is a side view of the tillage assembly.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a mobile mollusk harvesting machine that allows users to quickly and efficiently process a clam aquaculture site during harvesting periods. The present invention will process clams buried in the dirt by agitating and sifting the dirt containing the clams, thus isolating the clams so that workers may then gather them.

In general, referring to FIGS. 1-6, the present invention comprises a vehicle platform 1, a tillage assembly 2, a support frame 3, an agitating mechanism 4, and an angling mechanism 5.

The vehicle platform 1 may be any vehicle or vehicle-like apparatus suitable for traversing the tillage assembly 2 across an aquaculture site or other mollusc harvesting site in order to harvest the molluscs contained therein by agitating and sifting the dirt of the harvesting site in order to expose and collect the molluscs. In some embodiments, the vehicle platform 1 is a tractor. In some embodiments, the vehicle platform 1 is a tractor-like vehicular assembly.

The tillage assembly 2 is connected to the vehicle platform 1 by the support frame 3. The agitating mechanism 4 is operatively connected to the tillage assembly 2. More particularly, the agitating mechanism 4 is operatively connected between the support frame 3 and the tillage assembly 2 in some embodiments. In some embodiments, the agitating mechanism 4 is operatively connected between the vehicle platform 1 and the tillage assembly 2. The agitating mechanism 4 functions to shake the tillage assembly 2 in order to till the earth traversed by the vehicle platform 1 while the present invention is in use. Agitation of the tillage assembly 2 serves to separate and sift out any dirt, small rocks, plant matter, or other unwanted items from the molluscs desired to be harvested.

The tillage assembly 2 is connected to the vehicle platform 1 by the support frame 3 and comprises a tilling section 21. In some embodiments, the tillage assembly 2 may be connected directly to the vehicle platform 1. It may be understood that the support frame 3 refers to any structural members implemented to support the tillage assembly 2 and agitating mechanism 4 with the vehicle platform 1 in order to perform their proper function. In some embodiments, the support frame 3 may be integrated with the vehicle platform 1. In some embodiment, the support frame 3 may be pulled behind the vehicle platform 1 like a trailer.

The tilling section 21 is the main component of the present invention for sifting molluscs from the earth and other debris of the harvesting site. In the preferred embodiment, the tilling section 21 is generally flat and rectangular, though the tilling section 21 may have varying geometry in different embodiments. The angling mechanism 5 is operatively connected to the tilling section 21, wherein the angling mechanism 5 is configured to adjust a pitch angle of the tilling section 21. The pitch angle of the tilling section 21 may be lowered toward the ground in order to harvest molluscs or raised away from the ground in order to traverse the ground without performing the harvesting function of the present invention, or the pitch angle may be adjusted by the user in order to achieve a proper tilling angle into the ground for optimal harvesting. Tilling herein refers to the action of disturbing the soil, earth, or ground of the mollusc harvesting site in order to expose the molluscs shallowly buried within the said earth.

The tilling section 21 comprises a plurality of sifting rods 22 that are laterally distributed along the tilling section 21 and oriented longitudinally. The longitudinal direction used herein refers to the direction of the vehicle platform 1 while traveling straight. A lateral direction is correspondingly defined as perpendicular to the longitudinal direction and parallel to the ground, or east-west, if the longitudinal direction is alternatively defined as north-south in reference to the vehicle platform 1 (not the cardinal directions of the planet). The sifting rods are evenly spaced along the tilling section 21, leaving spaces through which the earth, rocks, plant matter and other debris of the harvesting site along with small molluscs may fall through due to the agitation implemented by the agitation mechanism, retaining and exposing any properly sized molluscs contained within the tilled earth. The agitating mechanism 4 is configured to longitudinally agitate the plurality of sifting rods 22. This agitation facilitates the purpose of disturbing the earth in addition to sifting the earth and other unwanted debris through the spaces between the plurality of sifting rods 22 of the tilling section 21. In the preferred embodiment, the angling mechanism 5 comprises a hydraulic actuator 6 connected between the vehicle platform 1 and the support frame 3. In various embodiments, the angling mechanism 5 may take any suitable form to achieve the aforementioned purpose.

Figure 7:
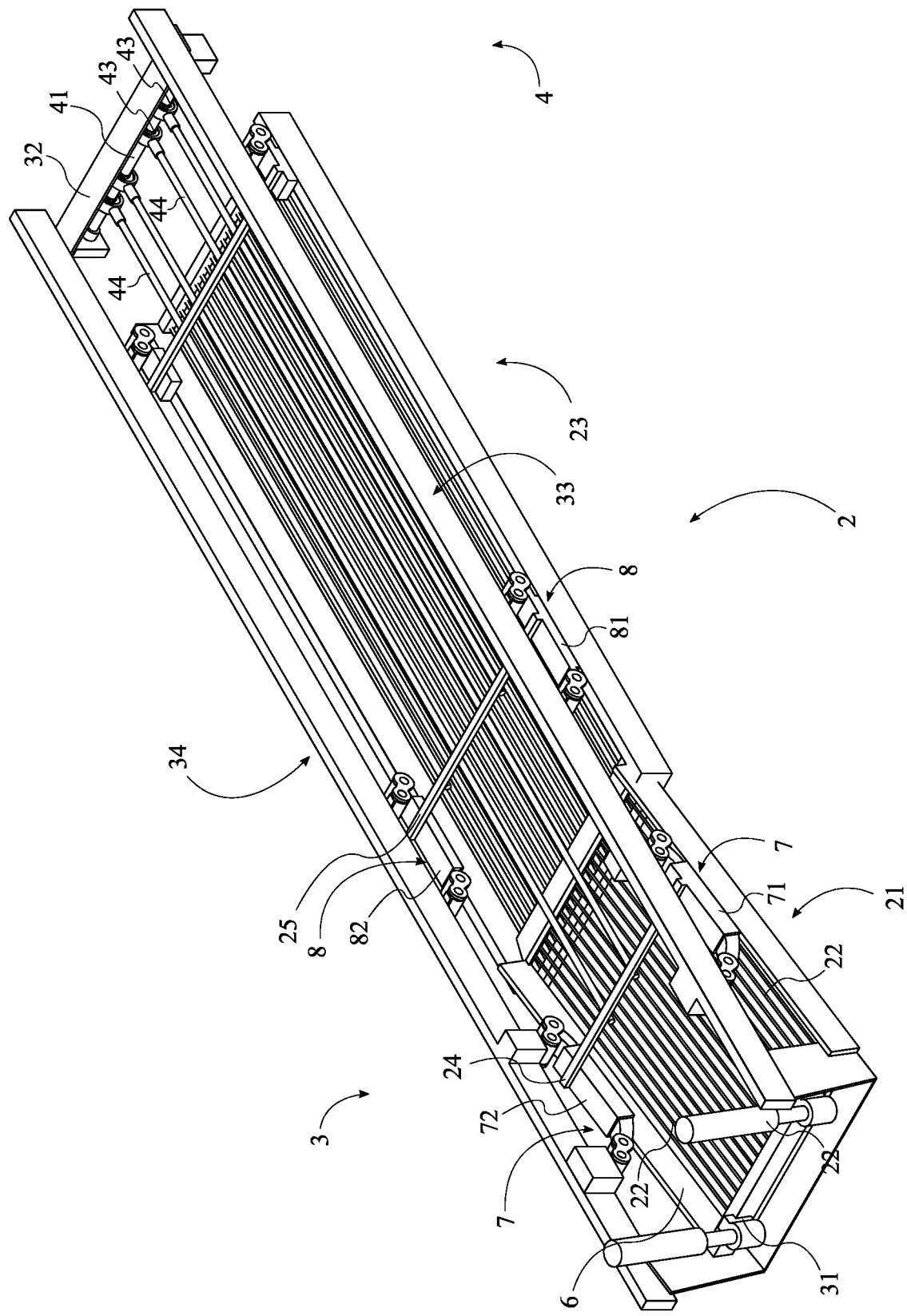
FIG. 7 is an elevated front perspective view of the tillage assembly.

In some embodiments, the support frame 3 comprises a front beam 31, a rear beam 32, a first lateral side 33 and a second lateral side 34, as shown in FIG. 7. The front beam 31 and the rear being are oriented laterally and parallel to each other, are positioned longitudinally opposite each other along the support frame 3 and are connected between the first lateral side 33 and the second lateral side 34. In the preferred embodiment, the hydraulic actuator 6 is connected between the vehicle platform 1 and the front beam 31 of the support frame 3.

In the preferred embodiment, the tillage assembly 2 further comprises a sifting section 23. The sifting section 23 is positioned longitudinally adjacent to the tilling section 21. Similar to the tilling section 21, the sifting section 23 further comprises a plurality of sifting rods 22 that are laterally distributed along the sifting section 23 and oriented longitudinally. The sifting section 23 essentially extends the available sifting area of the tillage assembly 2 rearward along the support frame 3. In the preferred embodiment, the sifting section 23 and the tilling section 21 are not directly connected to each other and are agitated independently with the agitation mechanism. This is desirable so that the pitch angle of the tilling section 21 may be adjusted without changing the angle of the entire tillage assembly 2.

In the preferred embodiment, the tillage assembly 2 is supported beneath the vehicle platform 1 adjacent to the earth by the support frame 3. Furthermore, while the support frame 3 is rigidly fixed to the vehicle platform 1, the tillage assembly 2 is moveable with reference to the vehicle platform 1 in order to permit the desired agitation motion of the tillage assembly 2. To this end, the present invention comprises at least one tilling section support member 7 through which the tilling section 21 is rotatably mounted to the support frame 3. The aforementioned rotatably mounted connection of the tilling section 21 to the support frame 3 through the at least one tilling section support member 7 allows the tilling section 21 to undergo the desired agitation motion. The rotational nature of said connection is due to a rotatable connection, such as a pin or hinge, of the at least one tilling section support member 7 to the support frame 3, and a similar connection between the at least one tilling section support member 7 and the tilling section 21. In other embodiments, other mechanical connections may be utilized in order to allow the agitation motion, such as, but not limited to, a linear track connection, or any other suitable type of connection.

More particularly, in the preferred embodiment the at least one tilling section support member 7 comprises a first tilling section support member 71 and a second tilling section support member 72. The first tilling section support member 71 and the second tilling section support member 72 are positioned laterally opposite each other along the tilling section 21. The first tilling section support member 71 is connected between the tilling section 21 and the first lateral side 33 of the support frame 3 in the preferred embodiment. Similarly, the second tilling section support member 72 is connected between the tilling section 21 and the second lateral side 34 of the support frame 3 in the preferred embodiment. In other embodiments, any other suitable arrangements may be comprised to connect the tilling section 21 to the support frame 3.

Similarly, the preferred embodiment further comprises at least one sifting section support member 8, and the sifting section 23 of the tillage assembly 2 is rotatably mounted to the support frame 3 through the at least one sifting section support member 8.

More particularly, the at least one sifting section support member 8 comprises a first sifting section support member 81 and a second sifting section support member 82. The first sifting section support member 81 and the second sifting section support member 82 are positioned laterally opposite each other along the sifting section 23. The first sifting section support member 81 is connected between the sifting section 23 and the first lateral side 33 of the support frame 3, while the second sifting section support member 82 is connected between the sifting section 23 and the second lateral side 34 of the support frame 3. In other embodiments, any other suitable arrangements or geometries may be utilized in order to support the tillage assembly 2 at the proper height above the ground while allowing the desired agitation motion.

Figure 8:
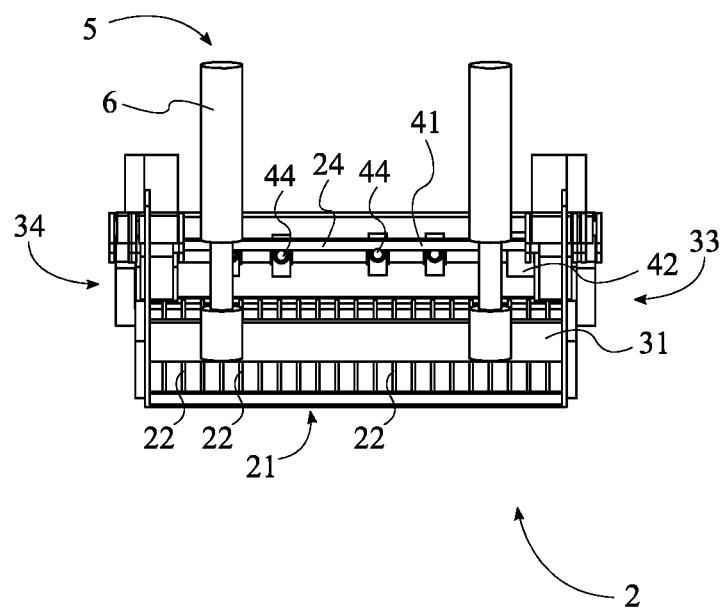
FIG. 8 is a front view of the tillage assembly.
Figure 9:
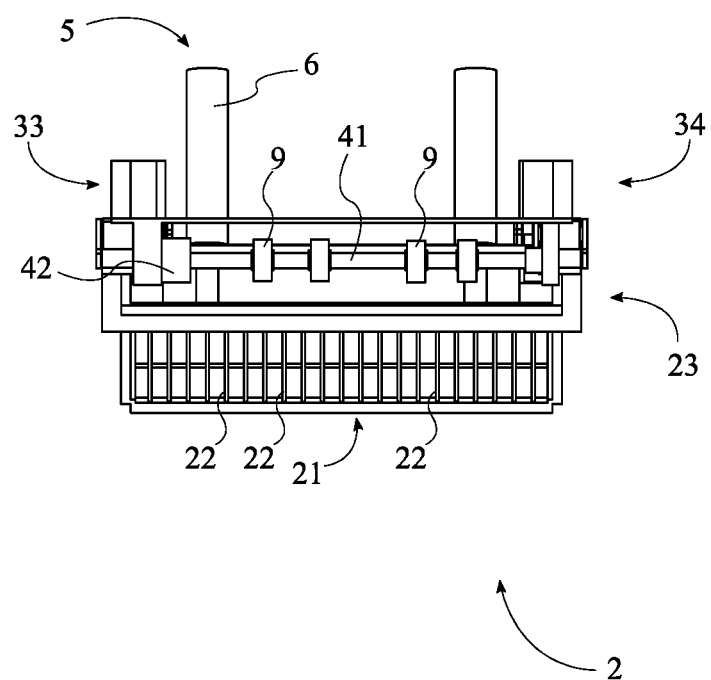
FIG. 9 is a rear view of the tillage assembly.

Referring to FIGS. 7-9, in the preferred embodiment of the present invention, the agitating mechanism 4 comprises an axle 41, a motor 42, a plurality of cams 43, and a plurality of agitating rods 44. In the preferred embodiment, the axle 41 is laterally mounted to the support frame 3 adjacent to the rear beam 32, and the motor 42 is operationally coupled with the axle 41, wherein the axle 41 is rotated by the motor 42. Each of the plurality of cams 43 is an eccentric, off-axis rotating component utilized to transform the rotary motion of the axle 41 into reciprocal linear motion in order to agitate the tillage assembly 2 with the plurality of agitating rods 44. Each of the plurality of cams 43 is rotatably coupled with the axle 41, and each of the plurality of agitating rods 44 is operatively coupled with one of the plurality of cams 43. The plurality of agitating rods 44 is then connected to the tillage assembly 2 opposite the axle 41 along the plurality of agitating rods 44, such that the plurality of rods bridges the distance between the axle 41 and the tillage assembly 2. Thus, the plurality of cams 43 is configured to agitate the tillage assembly 2 through the plurality of rods.

Figure 10:
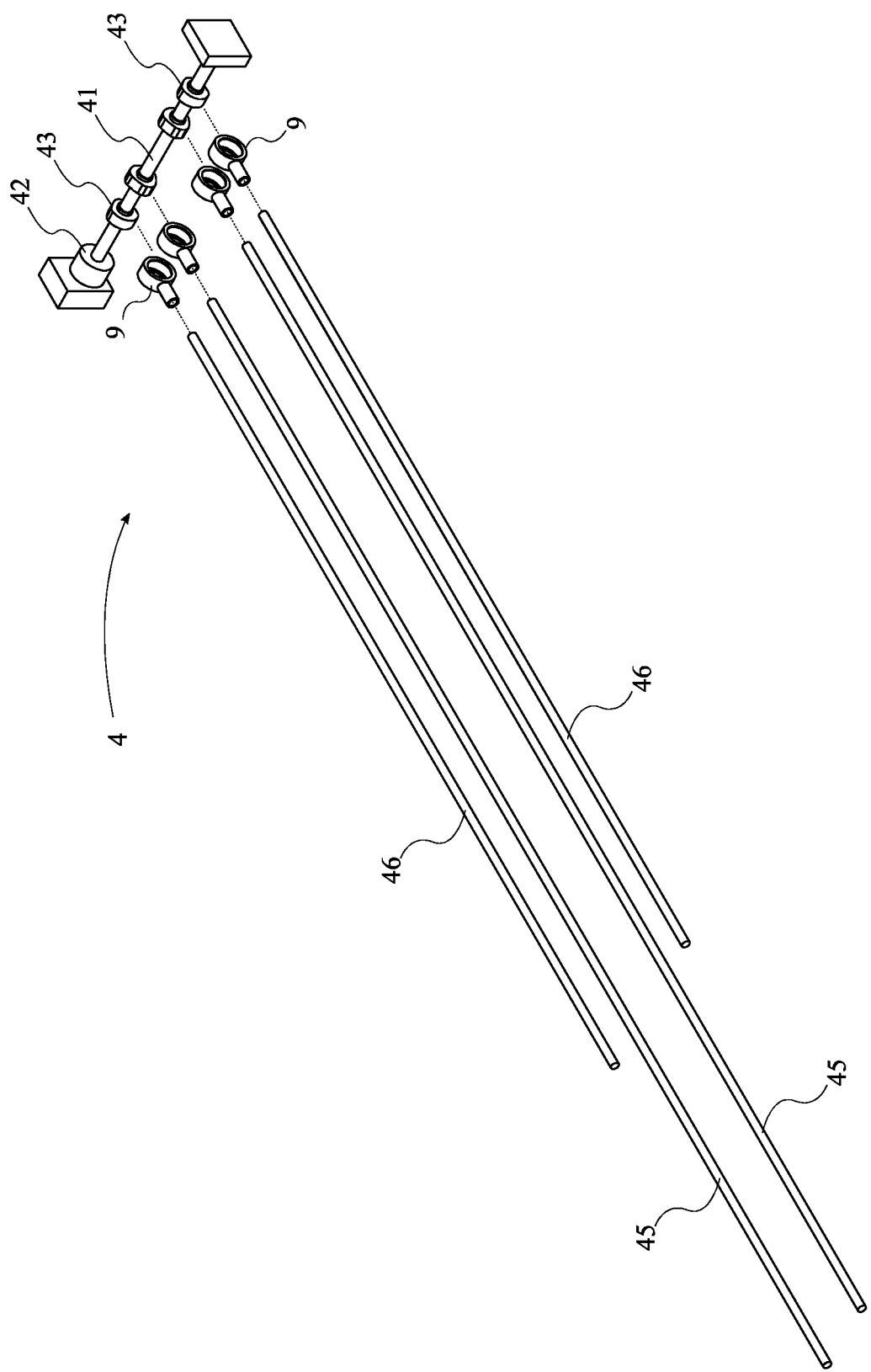
FIG. 10 is an exploded view of the agitating mechanism.

The specific means through which the plurality of rods is coupled to the plurality of cams 43 in order to produce the agitating motion may vary in different embodiments. However, in the preferred embodiment, a plurality of annular sheaths 9 is utilized, as shown in FIG. 10. Each of the plurality of annular sheaths 9 is concentrically engaged around one of the plurality of cams 43, and each of the plurality of annular sheaths 9 is connected to one of the plurality of agitating rods 44 opposite the tillage assembly 2 along the plurality of agitating rods 44. Thus, as the axle 41 rotates, the plurality of cams 43 causes the plurality of annular sheaths 9 to trace an off-axis path around the axle 41, thus producing reciprocal motion in the connected agitating rods, and thus agitating the tilling section 21 and the sifting section 23 of the tillage assembly 2.

In the preferred embodiment, the plurality of agitating rods 44 comprises a first pair of agitating rods 45 and a second pair of agitating rods 46 as shown in FIG. 10. The first pair of agitating rods 45 is connected between the axle 41 and the tilling section 21 of the tillage assembly 2, and the second pair of agitating rods 46 is connected between the axle 41 and the sifting section 23 of the tillage assembly 2.

Moreover, the tillage assembly 2 further comprises a first transfer member 24 and a second transfer member 25. The first transfer member 24 is connected to the tilling section 21, and the second transfer member 25 is connected to the sifting section 23. Preferably, the first transfer member 24 is oriented laterally and connected between the first sifting section support member 81 and the second sifting section support member 82, though the specific location of the transfer member may vary in different embodiments. Similarly, the second transfer member 25 is preferably oriented laterally and connected between the first sifting section support member 81 and the second sifting section support member 82. The first pair of agitating rods 45 is connected between the axle 41 and the first transfer member 24, and the second pair of agitating rods 46 is connected between the axle 41 and the second transfer member 25. Thus, the tilling section 21 and the sifting section 23 of the tillage assembly 2 may be agitated independently of each other. Furthermore, in some embodiments, the first pair of agitating rods 45 is connected to a first pair of cams at the axle 41, while the second pair of agitating rods 46 is connected to a second pair of cams at the axle 41. In some embodiments, the first pair of cams and the second pair of cams may be radially oriented out of phase with each other by a desired angle; for example, 180 degrees. Thus, in embodiments where the first pair of cams and the second pair of cams are oriented 180 degrees out of phase with each other, with each rotation of the axle 41, the tilling section 21 and the sifting section 23 move in opposite longitudinal directions during agitation. This may enhance the sifting effect of the tilling assembly. However, the alignment of the cams may vary as desired in various embodiments.

The following is an alternate, exemplary description of the present invention and is intended to further demonstrate the spirit of the present invention along with various details which may be implemented in different embodiments and should not be considered to be limiting.

The present invention is an extractor assembly. More specifically, the extractor is a mobile clam harvester that allows the user to quickly and efficiently process a clam aquaculture site during harvesting periods. One user will operate the extractor assembly such that the user drives the extractor assembly. The extractor will process said clams buried in the dirt by exposing the clams on the surface of the ground, where other workers can then pick up the clams. The extractor comprises: a tractor, a sift, and a shaker. The tractor is the vehicle of the extractor assembly that the user drives and operates. More specifically, the tractor serves as the mobile platform for the extractor such that the extractor can easily traverse and process the clam aquaculture site during harvesting periods. The tractor also allows the extractor to be parked and stored easily when not in use. Additionally, the tractor serves as the main platform for the sift such that the sift is directed on the bottom of the tractor. Furthermore, the tractor serves as the main platform for the shaker, such that it bridges the shaker on to the sift. The tractor comprises: a controller, an engine, a pump, a deck, and a suspension. The controller is situated and accessible on the user driver portion of the tractor. More specifically, the controller serves as the main dashboard of the extractor assembly such that the user can: drive, operate, and/or manipulate the extractor assembly. The controller further comprises: a first remote, and a second remote. The first remote serves as the tractor driver dashboard for the user. More specifically, the first remote allows the user to toggle, steer, and/or brake the tractor. The second remote serves as the hydraulic dashboard for the user. More specifically, the second remote allows the user to toggle, manipulate, and/or adjust the sift, and/or shaker portions of the extractor assembly.

The engine is incorporated on to the tractor. Additionally, the engine is connected to the first remote of the tractor. More specifically, the engine is the main power supply of the tractor. In the preferred embodiment of the present invention, the engine takes form of a gasoline powered engine but can be any type of engine that sufficiently powers the tractor. The pump is powered by the engine. Additionally, the pump is connected to the second remote. More specifically, the pump is a hydraulic power supply that powers the shaker and the suspension portions of the extractor assembly.

The deck is situated on the ground side portion of the tractor. More specifically, the deck is the main mounting platform of the tractor assembly that allows the sift to attach on to the bottom of the tractor. The deck comprises: a first beam, the second beam, and a third beam. The first beam is the mounting platform located on the input end of the tractor, when the tractor moves forward. More specifically, the first beam is the front mounting platform that fixes the suspension on to the tractor. The second beam is in between the first beam and the third beam of the deck. More specifically, the second beam serves as the deck body mounting platform that fixes the strainer portion of the sift on to the tractor. The third beam is the mounting platform located on the output end of the tractor, opposite to the first beam. More specifically, the third beam is the rear mounting platform that fixes the shaker on to the tractor.

The suspension resides on the deck side of the tractor. Additionally, the suspension is located on the first beam of the deck. Furthermore, the suspension is connected to the pump, and is manipulated by the second remote. More specifically, the suspension is a hydraulic adjustable member that connects the sift on to the first beam end of the tractor. Additionally, the suspension allows the sift to extend/and/or retract on to the first beam end of the tractor such that it changes the angle of declination of the sift. The piston is the base of the suspension that direct fixes on to the first beam of the deck. More specifically, the piston is the fixed chassis of the hydraulic suspension that anchors on to the first beam of the deck. The arm resides in the piston. Additionally, the arm attaches on to the first beam end of the sift. More specifically, the arm is the movable portion of the hydraulic suspension that can extend and/or retract the first beam end of the sift. The sift resides on the deck portion of the tractor. More specifically, the sift is the integrated clam harvester machine that collects and processes harvestable clams from small clams and debris. The sift comprises: a plow, a strainer, and a sled. The plow portion of the sift is located on the first beam end of the deck. Additionally, the plow is attached on to the arm end of the suspension. More specifically, the plow serves as the movable portion of the sift that grades a layer of the ground that contains a mixture of debris, small clams, and/or harvestable clams. Additionally, the plow serves as the primary separation mechanism to separate the debris and small clams from the harvestable clams.

The plow comprises: a trough, a first grill, a first bracket, and a second bracket. The trough is directly adjacent to the ground. More specifically, the trough is the ramped portion of the sift that grades the ground. Additionally, the trough serves as the primary collection member of the harvestable clams. The first grill proceeds after the trough. More specifically, the first grill serves as the angled-primary separator of the graded material collected by the trough. The first grill separates debris and small clams from the harvestable clams, where the debris and small clams will pass through the first grill and allowing the harvestable clams to traverse through the first grill.

The first bracket resides on the plow end of the sift. More specifically, the first bracket serves as the attachment joint that connects on to the arm portion of the suspension. The second bracket is attached on to the plow end of the sift. Additionally, the second bracket is opposite to the first grill, closer to the deck side of the tractor. More specifically, the second bracket serves as the attachment member that connects the plow on to the shaker.

The strainer is directly adjacent to plow portion of the sift where it proceeds from the first grill. Additionally, the strainer is parallel to the deck portion of the tractor. Furthermore, the strainer traverses the profile of the deck. More specifically, the strainer is the main clam processing site that separates the debris and small clams from the harvestable clams. The second grill traverses the strainer profile. More specifically, the second grill resembles the first grill, but serves as the leveled separator that filters the debris and small clams from the harvestable clams by allowing the debris and small clams to pass through the second grill, while the harvestable clams continue to traverse through the second grill profile of the sift.

The third bracket is fixed on to the strainer. More specifically, the third bracket serves as an attachment joint that connects the strainer to the second beam. The fourth bracket is fixed on to the strainer. Additionally, the fourth bracket traverses the strainer, such that it is perpendicular and opposite to the grill. Furthermore, the fourth bracket is aligned with the second bracket. The sled is opposite to the plow end of the sift. More specifically, the sled is the exit end of the sift, where harvestable clams traversing along the strainer will fall off.

The shaker is integrated within the third beam portion of the tractor. More specifically, the shaker is the vibrating agent of the sift that quakes the collected contents of the sift such that it separates the debris and small clams from the harvestable clams. Additionally, the shaker allows the collected contents to pass through the extractor assembly, while the tractor is propelled forward. The shaker comprises: a driver, an axle, a bearing, a plurality of cams, and a plurality of rods.

The driver is integrated on the third beam end of the tractor. Additionally, the driver is connected to the pump. More specifically, the driver is a hydraulic motor that serves as the main power supply of the shaker. The axle is connected to the driver, such that it rotates along the driver shaft. Additionally, the axle traverses the profile of the third beam. More specifically, the axle serves as the main drive shaft that bridges the rotational motion of the driver to the plurality of cams. The bearing resides on the third beam, opposite to the drive end. More specifically, the bearing retains the end of the axle, such that the axle is secures on to the third beam such that it can rotate freely.

The plurality of cams traverses along the concentric profile of the axle. More specifically, the plurality of cams is a series of counterweight shake agents that produces vibrations when rotated along the axle. The plurality of rods is attached on to the plurality of cams. Additionally, the plurality of rods traverses from the plurality of cams to the second bracket of the sift. More specifically, the plurality of rods bridges the vibrations generated by the shaker to the sift. The plurality of rods comprises: a first fastener, and a second fastener. The first fastener resides between the plurality of rods and the fourth bracket of the sift. More specifically, the first fastener fixes the plurality of rods on to the fourth bracket such that the vibrations can transfer over to the strainer portion of the sift. The second fastener resides between the plurality of rods and the second bracket of the sift. More specifically, the second fastener fixes the plurality of rods on to the second bracket such that the vibrations can transfer over to the plow portion of the sift.

Although the invention has been explained in relation to its preferred embodiment, it is to be understood that many other possible modifications and variations can be made without departing from the spirit and scope of the invention as hereinafter claimed.

What is claimed is:
1. A mollusk farming machine comprises:
a vehicle platform;
a tillage assembly;
a support frame;
an agitating mechanism;
an angling mechanism;
the tillage assembly being connected to the vehicle platform by the support frame;
the agitating mechanism being operatively connected to the tillage assembly;
the tillage assembly comprises a tilling section;
the angling mechanism being operatively connected to the tilling section, wherein the angling mechanism is configured to adjust a pitch angle of the tilling section;
the tilling section comprises a plurality of sifting rods;

the plurality of sifting rods being laterally distributed along the tilling section and oriented longitudinally; and the agitating mechanism being configured to longitudinally agitate the plurality of sifting rods.

2. The mollusk farming machine as claimed in claim 1 comprises:

the tillage assembly being connected to the vehicle platform by the support frame.

3. The mollusk farming machine as claimed in claim 1 comprises:

the agitating mechanism being operatively connected between the support frame and the tillage assembly.

4. The mollusk farming machine as claimed in claim 1 comprises:

the support frame comprises a front beam, a rear beam, a first lateral side and a second lateral side;

the front beam and the rear beam being oriented laterally and parallel to each other;

the front beam and the rear beam being positioned longitudinally opposite each other along the support frame; and the front beam and the rear beam being connected between the first lateral side and the second lateral side.

5. The mollusk farming machine as claimed in claim 1 comprises:

the angling mechanism comprises a hydraulic actuator; and the hydraulic actuator being connected between the vehicle platform and a front beam of the support frame.

6. The mollusk farming machine as claimed in claim 1 comprises:

the tillage assembly further comprises a sifting section; and the sifting section being positioned longitudinally adjacent to the tilling section.

7. The mollusk farming machine as claimed in claim 6 comprises:

the sifting section further comprises a plurality of sifting rods; and the plurality of sifting rods of the sifting section being laterally distributed along the sifting section and oriented longitudinally.

8. The mollusk farming machine as claimed in claim 1 comprises:

at least one tilling section support member; and the tilling section being rotatably mounted to the support frame through the at least one tilling section support member.

9. The mollusk farming machine as claimed in claim 8 comprises:

the at least one first tilling section support member comprises a first tilling section support member and a second tilling section support member;

the first tilling section support member and the second support member being positioned laterally opposite each other along the tilling section;

the first tilling section support member being connected between the tilling section and a first lateral side of the support frame; and the second tilling section support member being connected between the tilling section and a second lateral side of the support frame.

10. The mollusk farming machine as claimed in claim 1 comprises:

at least one sifting section support member; and a sifting section of the tillage assembly being rotatably mounted to the support frame through the at least one sifting section support member.

11. The mollusk farming machine as claimed in claim 10 comprises:

the at least one sifting section support member comprises a first sifting section support member and a second sifting section support member;

the first sifting section support member and the second sifting section support member being positioned laterally opposite each other along the sifting section;

the first sifting section support member being connected between the sifting section and a first lateral side of the support frame; and the second sifting section support member being connected between the sifting section and a second lateral side of the support frame.

12. The mollusk farming machine as claimed in claim 1 comprises:

the agitating mechanism comprises an axle, a motor, a plurality of cams, and a plurality of agitating rods;

the motor being operationally coupled with the axle, wherein the axle is rotated by the motor;

each of the plurality of cams being rotatably coupled with the axle;

each of the plurality of agitating rods being operatively coupled with one of the plurality of cams; and the plurality of agitating rods being connected to the tillage assembly opposite the axle along the plurality of agitating rods, wherein the plurality of cams is configured to agitate the tillage assembly through the plurality of agitating rods.

13. The mollusk farming machine as claimed in claim 12 comprises:

a plurality of annular sheaths;

each of the plurality of annular sheaths being concentrically engaged around one of the plurality of cams; and each of the plurality of annular sheaths being connected to one of the plurality of agitating rods opposite the tillage assembly along the plurality of agitating rods.

14. The mollusk farming machine as claimed in claim 12 comprises:

the axle being laterally mounted to the support frame adjacent to a rear beam of the support frame.

15. The mollusk farming machine as claimed in claim 12 comprises:

the plurality of agitating rods comprises a first pair of agitating rods 45 and a second pair of agitating rods 46;

the first pair of agitating rods 45 being connected between the axle and the tilling section of the tillage assembly; and the second pair of agitating rods 46 being connected between the axle and a sifting section of the tillage assembly.

16. The mollusk farming machine as claimed in claim 15 comprises:

the tillage assembly further comprises a first transfer member and a second transfer member;

the first transfer member being connected to the tilling section;

the second transfer member being connected to the sifting section;

the first pair of agitating rods 45 being connected between the axle and the first transfer member; and the second pair of agitating rods 46 being connected between the axle and the second transfer member.

\* \* \* \* \*